INVENTORS
RICHARD K. FRANCAIS
CLIFFORD A. HAUENSTEIN
JAMES O. BATES
BY Thomas S. MacDonald
ATTORNEY June 16, 1964    R. K. FRANCAIS ETAL    3,137,128
LIQUID BIPROPELLANT ROCKET ENGINE CONTROL SYSTEM
Filed April 25, 1960    3 Sheets-Sheet 2

INVENTORS
RICHARD K. FRANCAIS
CLIFFORD A. HAUENSTEIN
JAMES O. BATES
BY
Thomas F. MacDonald
ATTORNEY INVENTORS
RICHARD K. FRANCAIS
CLIFFORD A. HAUENSTEIN
JAMES O. BATES
BY Thomas S. MacDonald
ATTORNEY

United States Patent Office 3,137,128
Patented June 16, 1964

3,137,128
LIQUID BIPROPELLANT ROCKET ENGINE
CONTROL SYSTEM
Richard K. Francais, Sherman Oaks, Clifford A. Hauenstein, Canoga Park, and James O. Bates, Woodland Hills, Calif., assignors to North American Aviation, Inc.
Filed Apr. 25, 1960, Ser. No. 24,442
10 Claims. (Cl. 60—35.6)

This invention relates to a rocket engine control system and more particularly to a control system of a pump fed engine, in which the pump discharge pressure of a main liquid fuel is utilized to actuate the liquid oxidizer control valve and subsequently the main fuel control valve so as to provide for safe and efficient start sequencing and initiation of main stage combustion. The back pressure created by combustion is subsequently utilized to initiate the delivery of liquid fuel and oxidizer to a gas generator which provides for continuous turbine actuation.

Such a continuous turbine actuation system will be hereinafter referred to as the "bootstrap arrangement."

In the modern day liquid bipropellant rocket engines, in order to assure proper combustion, it is mandatory that a first propellant constituent (generally an oxidizer) be injected into the combustion chamber of the rocket engine prior to the injection of the second fuel propellant constituent thereto. Such a sequential system is necessitated since initial fuel and subsequent oxidizer flow would provide for undesirable and uncontrollable explosion phenomena. It is also necessary to maintain a very accurate and efficient bootstrap arrangement for assuring constant turbine actuation subsequent to the aforementioned combustion.

Prior attempts to cope with these basic problems by utilizing engine systems having conventional type engine start sequence control devices have generally provided for systems which are extremely complex in nature. Also, the prior art systems do not provide for the desired efficient reliability which the modern day rocket engine necessitates.

In contrast to the complex and relatively unreliable type state of the art liquid bipropellant rocket engine control systems, the present invention provides a system whereby a predetermined liquid fuel constituent discharge pressure initially functions to open a liquid oxidizer valve. A sequence valve is operatively associated with the liquid oxidizer valve so as to open subsequent to the opening of the liquid oxidizer valve. The sequence valve is in turn operatively connected to a main fuel valve so as to transmit the predetermined fuel discharge pressure thereto. This system then provides for the opening of the main fuel valve subsequent to the opening of the oxidizer valve. The main liquid fuel valve in turn permits the desired delayed injection of main liquid fuel in the combustion chamber of the rocket engine. The ignition of the propellant in the combustion chamber inherently creates a back pressure which is in turn utilized to force boot-strapped propellants to a gas generator so as to continuously actuate the rocket engine turbine.

As hereinbefore stated, such a system provides the desirable feature of permitting a liquid oxidizer to be injected into the combustion chamber of the rocket engine prior to the injection of main liquid fuel therein and further provides an efficient and durable turbine reactivation bootstrap arrangement. This relatively simple and inherently rugged system dispenses with the heretofore utilized complex prior art systems employing auxiliary pressure sensing devices and/or pilot valves.

An object of this invention is to provide a liquid bipropellant rocket engine control system which is inherently simple and rugged in construction and provides for a very accurate and desirable sequential injection of propellant constituents in the combustion chamber of a rocket engine.

A further object of this invention is to provide an energy means for initially actuating a turbine up to a predetermined speed range such that sufficient fuel constituent pump discharge pressure is made available to sequentially actuate the propellant constituent valves.

A further object of this invention is to provide a novel liquid bipropellant rocket engine control system wherein back pressures created by main rocket engine combustion provide for a simplified and highly accurate bootstrap arrangement forcing propellant constituents to a gas generator thus assuring continuous and efficient turbine actuation.

A still further object of this invention is to also utilize the energy means used to initially actuate the turbine for the ignition of non-hypergolic bootstrapped propellants in the gas generator.

A still further object of this invention is to provide a simplified method of sequentially controlling the injection of liquid propellant constituents in the combustion chamber of a rocket engine by utilizing the pump discharge pressure of a first liquid propellant for the sequential control thereof.

A still further object of this invention is to provide for instantaneous termination of rocket engine propellant injection.

These and other objects of the invention will become apparent from the following description taken in connection with the accompanying drawings, in which.

The purpose of this invention is to provide a reliable liquid bipropellant rocket engine control system which assures sufficient flow and injection of one of the propellant constituents to the combustion chamber of the rocket engine prior to the injection of the second propellant constituent therein. In modern day missile rocket engine applications, the first propellant constituent generally takes the form of a liquid oxidizer while the second constituent comprises the main liquid fuel. A turbine drives the liquid oxidizer and liquid main fuel pumps at a predetermined speed so as to discharge the constituents at predetermined pressures. A main fuel discharge pressure sensor line is operatively connected to the liquid oxidizer valve and permits the opening thereof at a predetermined main fuel pressure. The sequence valve is operatively connected to the main oxidizer valve and adapted to open subsequently thereto. The sequence valve permits the discharge pressure of the main fuel to be sensed by the main liquid fuel valve and permits the opening thereof subsequent to the opening of the main oxidizer and sequence valves. The system thus provides for the desired initial injection of the oxidizer in the combustion chamber of the rocket engine prior to the injection of main liquid fuel therein. A bootstrap arrangement is included in the system and utilizes the back pressures created by propellant combustion to continuously actuate the turbine and thus assure sufficient propellant constituent flow.

It is to be understood that although the following description will describe the turbo pumps as discharging a main fuel and a liquid oxidizer, other compatible type bipropellant constituents may be utilized depending on the specific application thereof. Liquid oxygen is hereinafter set-forth for illustrative purposes and describes only one preferred specific conventional type propellant constituent.

A brief introductory description of the present invention will be described with direct reference to FIG. 1 wherein a turbine starter 1 is adapted to receive a signal from an ignition source in the conventional manner and is initially fired so as to deliver a predetermined amount of energy to the blades (not shown) of turbine 2.

Figure 1:
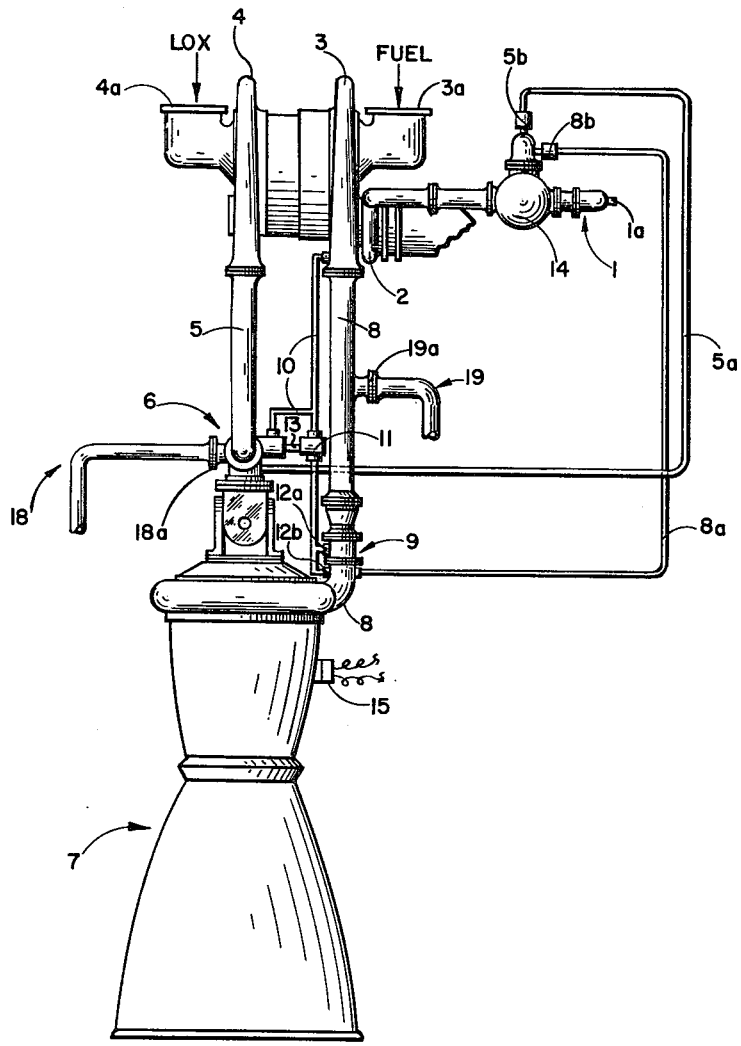
FIG. 1 is a side view of the rocket engine control system.

FIG. 1 further discloses turbo-pumps 3 and 4 adapted to be actuated by turbine 2 thus providing for the selective discharge of the liquid propellant constituents through passages 8 and 5 respectively. Liquid oxygen passage 5 and main liquid fuel passage 8 connect to valves 6 and 9 respectively and are adapted for selective opening so as to permit the propellant constituents to be injected into the combustion chamber of rocket engine 7. A main liquid fuel sensing passage 10 operatively connects passage 8 to liquid oxygen valve 6 and a sequence valve 11. Valves 6 and 11 are mechanically and operationally connected by a connecting rod 13. Overboard relief units 18 and 19 are secured to passages 5 and 8 respectively, and provide for excessive pressurized liquid therein.

The bootstrap arrangement as shown in FIG. 1 comprises conduits 5a and 8a which are connected to passages 5 and 8 respectively and thus adapted to tap-off predetermined amounts of liquid propellant constituents therefrom. The conduits are in turn operatively connected to gas generator 14. Check valves 5b and 8b are secured in the respective conduits and are positioned adjacent the gas generator.

Figure 2:
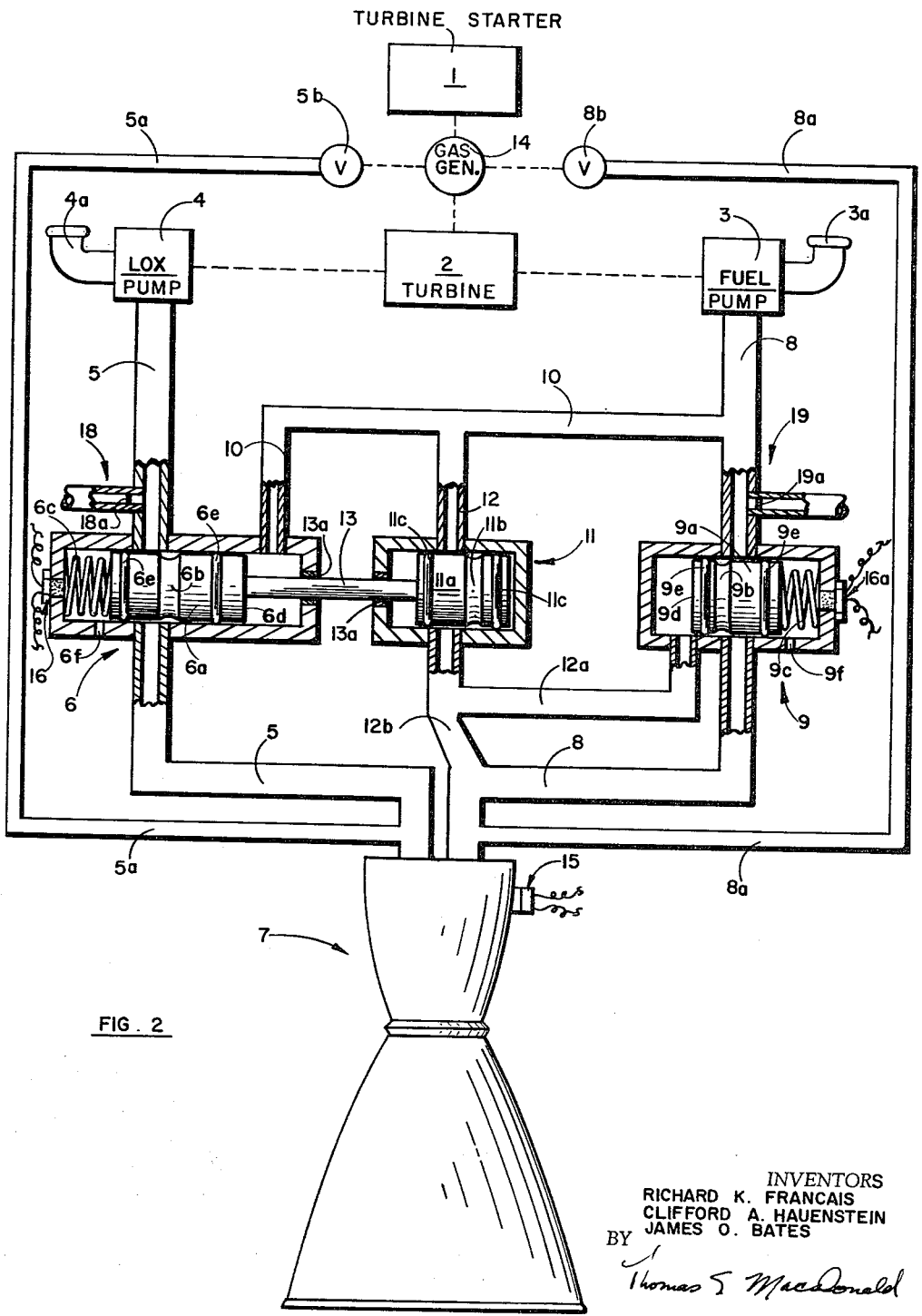
FIG. 2 is a detailed schematic sectional showing of the basic operational elements of the system disclosed in FIG. 1.
Figure 3:
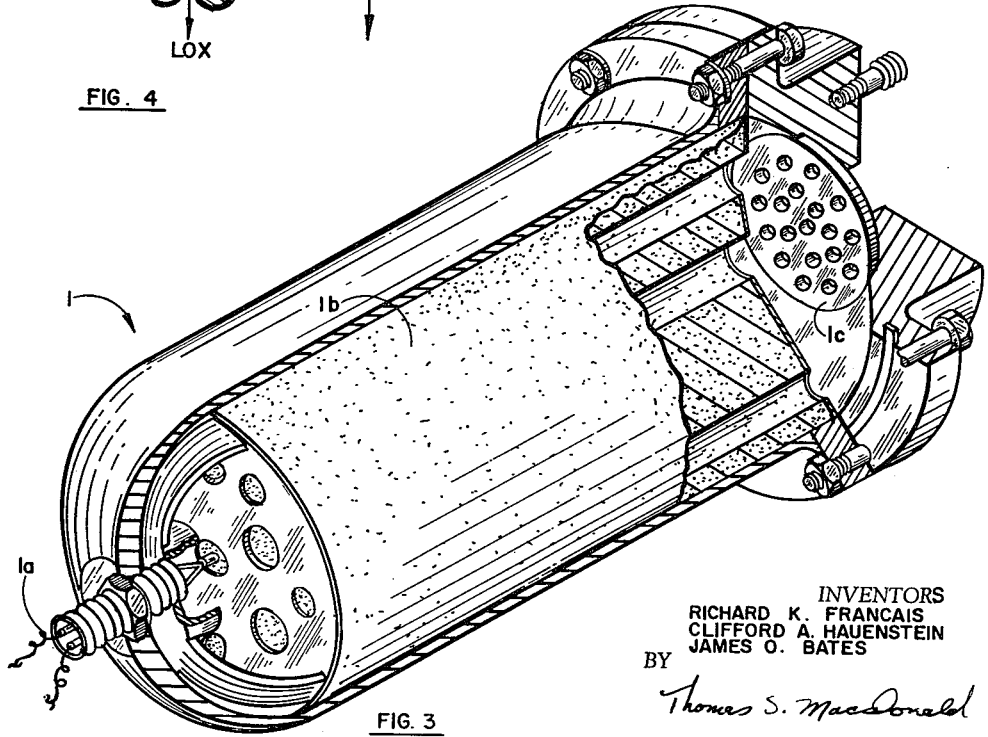
FIG. 3 is a detailed iso-metric cross-sectional view of a turbine starter which may be utilized in the rocket engine control system.

Having generally described the invention as disclosed in FIG. 1, attention is now directed to the specific structural component make-ups of the invention as shown in FIG. 2 and FIG. 3.

It is to be noted that the structural arrangements as disclosed in FIG. 2 do not specifically coincide with those disclosed in FIG. 1. Such a combined partial schematic and partial structural FIG. 2 slightly revised showing would appear to more clearly illustrate the present invention. It is to be further understood that although the structural arrangements of FIG. 2 are slightly changed, the functional arrangements thereof coincide exactly with those of FIG. 1.

As hereinbefore stated, turbine starter 1 is initially fired to deliver a predetermined amount of energy to turbine 2. Turbine starter 1 (FIG. 3) is illustrative of one type which may be employed in the rocket engine control system. FIG. 3 discloses an ignition terminal 1a which is adapted to be operatively connected to the aforementioned conventional type ignition starter and is effective to ignite the combustible turbine starter propellant 1b. The starter propellant may take the form of any well known combustible material having a sufficiently low flame temperature (so as not to damage the turbine). An ammonium nitrate (approximately 80%) and polybutadiene (approximately 20%) propellant combination has proved adequate. It has been found advantageous to design the cartridge to operate at about 1000 p.s.i.a. in order to utilize a sonic nozzle (not shown) to achieve the desired turbine inlet pressure and temperature of approximately 200 p.s.i.a. and 1700° F., respectively, so as to prevent pressure variation in the cartridge due to downstream pressure fluctuations. The propellant 1b should be such that the products of combustion thereof are both physically and chemically compatible with the gas generator and turbine system. The specific configuration of the FIG. 3 turbine starter, per se, does not comprise part of this invention. As hereinbefore stated, any conventional type starter may be substituted therefor.

The hot gases (energy) resulting from the ignition of the turbine starter material 1b exits through plate 1c into the turbine 2 and actuate turbo or discharge pumps 3 and 4.

FIG. 2 clearly discloses the basic control system of this invention wherein liquid oxidizer turbo pump 4 is adapted to discharge a liquid oxidizer into passage 5. Passage 5 is in turn operatively connected to an oxidizer valve 6.

Oxidizer valve 6 is shown as comprising a housing slidably mounting a spool type poppet member 6a having a circumferential groove or passage 6b formed thereon. Although FIG. 2 discloses 6b as comprising a circumferential grooved configuration, it is to be understood that in lieu thereof a unidirectional lateral passage may be utilized. Such a groove is adapted to be longitudinally moved so as to permit the flow of liquid oxidizer therethrough. A spring 6c is adapted to bias the spool 6a in closed position as shown in FIG. 2, prior to a predetermined fuel discharge pressure which is adapted to bear against wall 6d of the spool poppet 6a to effect an opening thereof. Conventional type O-ring seals 6e function to prevent the liquid oxidizer, flowing through passage 5, from passing thereby. A port 6f, the function of which will be hereinafter explained, is formed in the housing of oxidizer valve 6 and exits to an ambient environment.

Liquid oxidizer passage 5 terminates at a conventional type combustion chamber (not shown) formed in a rocket engine generally noted as 7. The specific construction of the conventional type rocket engine 7, essentially comprising an injector plate, combustion chamber and nozzle will not be described since the specific design thereof does not comprise a part of this invention.

A main liquid fuel passage 8 is adapted to receive the discharged liquid fuel and ultimately transmits the same through the injector plate into the combustion chamber of rocket engine 7. A main fuel valve 9, similar in construction to oxidizer valve 6, comprises a housing slidably mounting a spool poppet member 9a having a circumferential groove or passage 9b formed therein. A spring 9c is adapted to bias the spool poppet 9a in a closed or leftward position as viewed in FIG. 2. Surface 9d is adapted to receive a force thereagainst for the opening of the poppet 9a at the aforementioned predetermined main liquid fuel pressure. Ring seals 9e function to prevent the flow of main liquid fuel thereby. A port 9f is formed in the housing of main fuel valve 9 and exits to an ambient environment. The main fuel passage 8 operatively connects the main fuel valve 9 with the combustion chamber of rocket engine 7.

The level of discharge pressure at the exit of turbo pump 3 is sensed by a passage 10 which permits the flow of main liquid fuel to the oxidizer valve 6 and a sequence valve 11 is constructed in a fashion similar to valves 6 and 9. A poppet member 11a having a circumferential groove 11b formed therein is slidably mounted and thus capable of permitting the flow of main liquid fuel from passage 10 through passage 12 into the main fuel valve 9. Ring seals 11c function to prevent the flow of liquid fuel thereby.

Connecting rod 13 joins the oxidizer valve poppet 6a to the sequence valve poppet 11a. Conventional type sealing means can be employed at 13a and such means function to prevent the undesirable flow of liquid fuel thereby. It is to be noted that should the oxidizer valve poppet 6a be moved in a leftward direction, as viewed in FIG. 2, the liquid oxidizer is permitted to pass through groove 6b of poppet 6a prior to the passage of main liquid fuel through groove 11b of the sequence valve 11.

Below sequence valve 11 (FIG. 2) passage 12 is constructed so as to provide passages 12a and 12b operatively connecting main fuel valve 9 and main fuel passage 8, respectively. The reason for this construction will be hereinafter described.

It is to be understood that the spool-like constructions of valves 6, 9 and 11 are by way of illustration only and other conventional type butterfly, poppet, etc. valves may be employed in lieu thereof without destroying the inventive concept of this invention.

A bootstrap arrangement comprises passages 5a and 8a tapped into liquid oxidizer passage 5 and main liquid fuel passage 8, respectively. The passages 5a and 8a are bootstrapped to a gas generator 14 so as to provide for constant renewal of the energy necessitated for actuation of the turbine 2. Such a bootstrap arrangement is constructed to function pursuant to a predetermined level of combustion chamber back pressure.

The hereinbefore described bootstrap arrangement, employing passages 5a and 8a connected to a gas generator 14, are sophisticatedly shown in FIG. 2 as comprising cracking gas generator check and relief valves 5b and 8b, respectively.

Fuel inlets 3a and 4a provide for fuel and oxidizer induction to turbo-pumps 3 and 4, respectively. As hereinbefore stated, although the present description is directed to a fuel and an oxidizer constituent it is to be understood that numerous other liquid bipropellant constituents may be utilized depending on the specific application thereof.

A conventional type solid propellant (pyrotechnic charge) cartridge device 15 is constructed to project into the combustion chamber of rocket engine 7 and is adapted to initiate propellant combustion. A similar cartridge 16 is formed on oxidizer valve 6 and functions to rapidly close the flow of propellant constituents to rocket engine 7. Any conventional type pyrotechnic charge may be employed in the cartridges so long as they are physically as well as chemically compatible with their respective actuated devices. A like cartridge 16a may be operatively attached to main fuel valve 9 if so desired.

As hereinbefore stated, passages 5 and 8 are provided with overboard relief units 18 and 19 respectively. Burst diaphragms 18a and 19a respectively located therein, are adapted to break at predetermined liquid propellant constituent pressure level.

Figure 4:
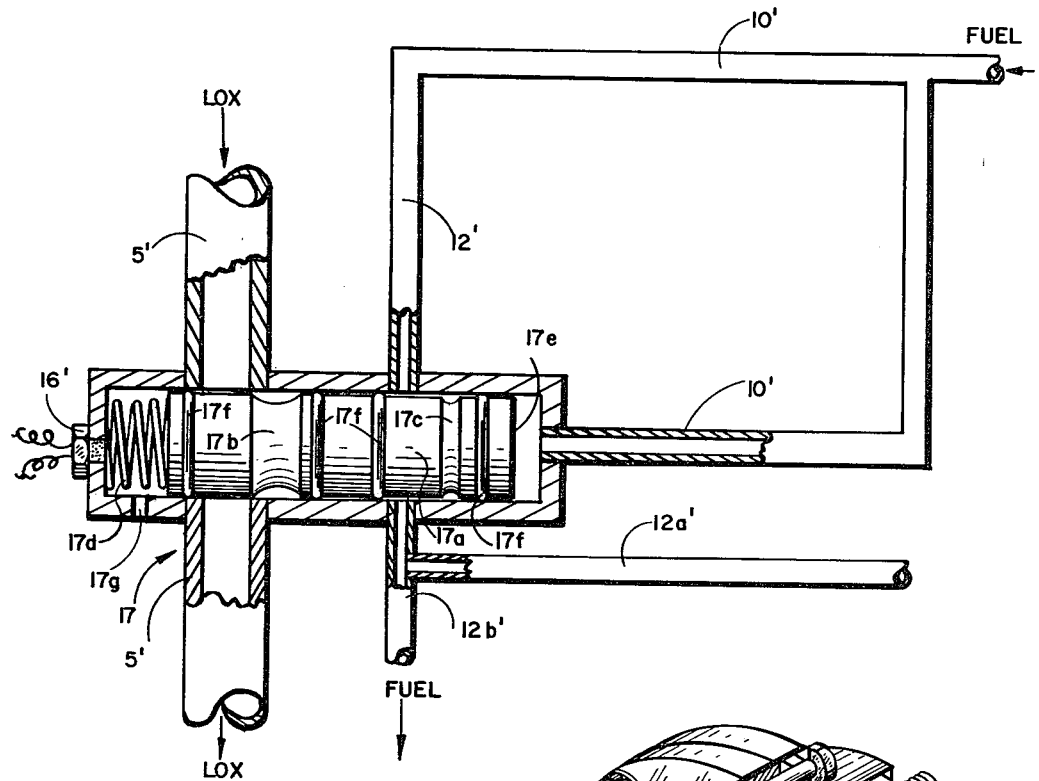
FIG. 4 is a cross-sectional view of an alternative oxidizer-sequence valve combination.

FIG. 4 discloses an alternative oxidizer-sequence valve combination embodiment. A poppet member 17a is slidably mounted in a housing and has circumferential grooves 17b and 17c formed therein. A spring 17d is so constructed and arranged so as to bias the poppet member 17a in a rightward direction. In this modification, the relative position of the liquid oxidizer passage 5' is identical to that of passage 5 (FIG. 2) and is adapted to pass liquid oxidizer through groove 17b when a predetermined liquid fuel pressure is sensed in one leg of dual passage 10' and imparted to surface 17e of poppet member 17a. Subsequent to the initial flow of liquid oxygen through passage 17b, liquid fuel is permitted to pass through the other leg of passage 10', passage 12' and groove 17c of poppet member 17a. Passage 12' is in turn connected to the main liquid fuel passage 8 and main fuel valve 9 by passages 12a' and 12b', respectively, in the manner shown connecting passages 12a and 12b thereto in FIG. 2. Ring seals 17f are positioned on poppet member 17a and function to prevent undesirable escapement of the liquid propellant constituents.

As hereinbefore stated, although specific valve constructions have been shown, it is to be understood that the method of controlling liquid bipropellant fuel flows to the rocket engine can be readily achieved by other individual conventional type valves.

Method of Operation

The method for controlling the thrust of the hereinbefore described FIG. 1 and FIG. 2 liquid bipropellant rocket engine system is initiated by firing the turbine starter 1 so as to effectively ignite propellant 1b.

Simultaneously, the thrust chamber ignition cartridge 15 is activated. This energy source, which may be either ground or chamber mounted, will in turn reliably produce sufficient effective heat energy in the preferred embodiment to guarantee main propellant ignition immediately upon propellant emission to the chamber.

As a result of the ignition of the turbine starter propellant 1b, energy (generally in the form of a hot gas) is delivered to the turbine 2 and causes the actuation thereof, preferably up to a maximum of around 70% nominal turbine horsepower. As viewed in FIG. 1, the energy created by the ignition of the turbine starter propellant 1b is also conducted into gas generator 14. The filling of gas generator 14 with this energy provides for a gas generator ignition source necessary for actuation of the hereinafter described bootstrap arrangement. Gas generator check and relief valves 5b and 8b are constructed in the conventional manner so as to check the retrograde passage of the aforementioned energy into conduits 5a and 8a, respectively.

Turbine 2, due to the energy imparted therein, actuates turbo pumps 3 and 4 so as to discharge liquid fuel and liquid oxidizer respectively, therefrom. When the liquid fuel discharge pressure achieves a predetermined level, poppet member 6a moves in a leftward direction as viewed in FIG. 2 due to the pressure sensed in passage 10. Such an actuation provides for the free flow of liquid oxygen through passage 5 and groove 6b formed on poppet member 6a.

Connecting rod 13 operatively connects poppet members 6a and 11a and due to the staggering of the respective circumferential grooves, 6b and 11b, as viewed in FIG. 2, a sequential opening of the liquid oxygen valve 6 and sequence valve 11 is achieved.

The constantly increasing turbine horsepower, which was heretofore stated as initially contsituting a maximum of around 70% nominal, is furthermore increased to compensate for the pump head pressure level decrease inherently occurring upon opening of the liquid oxygen valve 6.

Subsequent to the opening of sequence valve 11 the main liquid fuel valve is opened. The poppet member 9a and spring 9c combination is so constructed and arranged so as to move in a rightward direction as viewed in FIG. 2 upon sensing the aforementioned predetermined liquid fuel discharge pressure. Passage 12a provides for such a pressure actuated sequential main liquid valve opening.

FIG. 4, hereinbefore described, discloses a second main liquid oxygen-sequence valve combination which may be utilized to carry out the steps of this method of system operation.

FIG. 4 discloses a poppet member 17 which is adapted to move in a leftward direction against the biasing force of spring 17d when the aforementioned predetermined liquid fuel discharge pressure is imparted to poppet member wall 17e through passage 10'. As clearly shown, the passage 5' is initially opened to permit the flow of liquid oxygen therethrough prior to the flow of liquid fuel through passage 12'. Passage 12a' is connected to the main fuel valve in the same manner shown connecting passage 12 to the main fuel valve in FIG. 2.

Once the system is made operational, it is necessary to replenish the energy necessitated to drive turbine 2. Such a replenishment is provided in the form of a bootstrap arrangement comprising passages 5a and 8a which are adapted to receive the liquid oxidizer and main liquid fuel respectively. When combustion is initiated in the combustion chamber of rocket engine 7 by ignition of cartridge 15, back pressures are created which are effective to pump the propellant constituents into the gas generator as viewed in FIG. 2. Check and relief valve 5b and 8b are adapted to open at predetermined pressures so as to permit the desired respective quantitative flow of propellant constituents to gas generator 14.

Whereas it was desirable to initially inject liquid oxidizer into the combustion chamber of rocket engine 7 prior to the induction of liquid fuel thereto the order thereof is reversed when the constituents are induced into gas generator 14. The relative valves are so constructed that the pressure necessary to open valve 5b is less than that necessary to open valve 8b. This arrangement provides for a fuel lead which is effective to keep the relative temperature therein lower than those which would occur if the inductions of the liquid constituents were reversed. The relative amounts of propellant constituent flow thereto as compared to the rocket engine constituent flow is small. Therefore, the aforementioned undesirable and uncontrollable explosion phenomena does not occur in the gas generator.

Ignition is initiated when the liquid oxygen and fuel unite and are subjected to the hereinbefore mentioned hot energized gases generating from the turbine starter.

The system is now adapted to continuously operate so long as liquid oxygen and main liquid fuel are induced therein.

Should it be desired to stop the operation of the system the conventional type pyrotechnic charged cartridge 16 is ignited and generates an energized gas of sufficient magnitude to move poppet member 6a in a rightward direction as viewed in FIG. 2, thus, cutting off the supply of liquid oxygen through passage 5. Port 6f is so constructed so as to provide a safety escape passage assuring the ducting out of unnecessary and extremely pressurized damaging gases.

Sequence valve 11 is also closed since connecting rod 13 connects main liquid oxidizer valve poppet 6a and sequence valve poppet 11a.

Since the main liquid fuel flow from passage 12 to passage 12a is now terminated, spring 9c is effective to again close the main liquid fuel valve 9 by urging poppet member 9a in a leftward direction as viewed in FIG. 2.

Should it be desired to achieve a relatively faster main fuel valve closing a solid propellant cartridge 16a may also be formed on main fuel valve 9. Such a cartridge is adapted to function in the same manner as the cartridge 16 formed on liquid oxidizer valve 6. Vent 9f is constructed in the housing of main fuel valve 9 to permit the escapement of excessive and valve damaging pressurized gases.

Overboard bypass unit 18 (FIG. 2) may be formed integral with the liquid oxidizer passage 5 so as to provide an escape passage in the event a liquid oxidizer valve does not open or the surge pressure of the liquid oxygen at cutoff becomes excessive. A conventional type burst diaphragm unit 18a is constructed therein to permit the passage of liquid oxygen therethrough at such an excessive liquid oxidizer pressure. Such an arrangement prevents damaging effects to turbo-pump 4.

Likewise, an overboard bypass unit 19 including a burst diaphragm 19a may be formed in main liquid fuel line 8 so as to prevent damage to the main liquid fuel pump 3.

Such a cutoff system will provide for the sequential closing of the liquid oxidizer valve 6, sequence valve 11 and main fuel valve 9 thus, preventing propellant constituent flow to the rocket engine 7. The cutoff system further prevents the return flow of liquid propellant constituent to gas generator 14 via passages 5b and 8b.

When the main liquid oxygen-sequence valve combination of FIG. 4 is employed in lieu of the FIG. 2 combination, the shutoff sequence occurs in the same general manner. The pyrotechnic charge included in the cartridge 16' is ignited and the energy generated therefrom is sufficient to move the poppet 17a in a rightward direction so as to close main liquid oxygen passage 5' and main liquid sensing passage 12', thus sequentially closing main fuel valve 9 (FIG. 2).

Although the invention has been described and illustrated in detail, it is to be understood that the same is by way of illustration and example only and is not to be taken by way of limitation, the spirit and scope of this invention being limited only by the terms of the appended claims.

We claim:
1. A liquid bipropellant rocket engine sequential control system comprising: first discharge means for discharging a first bipropellant liquid constituent; second discharge means for discharging a second bipropellant liquid constituent; first and second valve means operatively connected to said first and second discharge means respectively, initially remaining in a closed position and adapted to sequentially open at a predetermined discharge pressure of said second liquid constituent, said second valve means being constructed and arranged to be structurally independent in its operation from said first valve means; sensing means operatively connecting said second discharge means and said first valve means for opening the first valve means when the first valve means senses said predetermined pressure of said second liquid constituent; sequence valve means operatively connected to said first valve means, said second valve means and said sensing means for passage of said second liquid constituent from said sensing means through said sequence valve means to said second valve means for the opening thereof subsequent to the opening of said first valve means.

2. The invention of claim 1 further comprising: thrust chamber means; first and second passage means operatively connecting said first and second valve means respectively, to said thrust chamber means, said thrust chamber means adapted to sequentially receive said first and second bipropellant liquid constituents when said first and second valve means are sequentially opened; said second passage means further operatively connected to said sensing means between said sequence valve means and said second valve means.

3. The invention of claim 2 further comprising: turbine starter means for selectively generating energy; turbine means operatively connected to said turbine starter means capable of actuation when generated energy is received from said turbine starter means; said turbine means operatively connected to said first and second discharge means for the selective actuation thereof.

4. The invention of claim 3 further comprising: actuation means operatively connected to said turbine starter means and said turbine means and adapted to receive a predetermined amount of energy generated by said turbine starter means; said actuation means operatively connected to said first and second passage means and operative to receive and ignite predetermined amounts of said first and second liquid constituents when a back pressure is created, due to bipropellant combustion, in said thrust chamber means so as to continuously and selectively actuate said turbine means.

5. The invention of claim 1 further comprising: closing means operatively connected to said first valve means for the selective closing thereof.

6. A bipropellant sequential control system comprising: first discharge means for discharging a first liquid constituent; second discharge means for discharging a second liquid constituent; actuated means operatively connected to said first and second discharge means and adapted to receive said first and second liquid constituents; first valve means operatively connected intermediate said first discharge means and said actutaed means for controlling the passage of said first liquid constituent to said actuated means and adapted to open when subjected to predetermined second liquid constituent discharge pressure; second valve means operatively connected intermediate said second discharge means and said actuated means for controlling the passage of said second liquid constituent to said actuated means, said second valve means being constructed and arranged to be structurally independent in its operation from said first valve means; control means operatively connecting said second discharge means to said first valve means for sensing said predetermined second liquid constituent discharge pressure and thereby initially opening said first valve means; said control means further operatively connecting said second discharge means and said second valve means opening said second valve means subsequent to the opening of said first valve means.

7. The invention of claim 6 further comprising closing means operatively connected to said first valve means for the selective closing thereof.

8. The invention of claim 6 further comprising: turbine means operatively connected to said first and second discharge means for discharging said first and second liquid constituents at a predetermined pressure; turbine starter means operatively connected to said turbine means for selectively generating and imparting energy thereto for the actuation of said turbine means.

9. The invention of claim 8 further comprising: actuation means operatively connected to said turbine starter means and further operatively connected intermediate said first valve means and said actuated means and said second valve means and said actuated means, said actuation means adapted to receive a predetermined amount of energy from said turbine starter means and further adapted to receive first and second liquid constituents therein when a predetermined back pressure is created in said actuated means, the energy received from said turbine starter means operative to ignite said first and second liquid constituents therein so as to continuously and selectively actuate said turbine means.

10. A method for controlling the thrust of a liquid bipropellant rocket engine utilizing sequentially introduced first and second liquid propellant constituents comprising the steps of discharging a first liquid constituent, discharging a second liquid constituent, initially permitting said first liquid constituent to flow to said rocket engine at a predetermined sensed second liquid constituent discharge pressure, subsequently permitting said second liquid constituent to flow to said rocket engine at said predetermined sensed second liquid constituent pressure, igniting said first and second liquid constituents in said rocket engine, creating a predetermined combustion pressure level, tapping off a predetermined amount of said first and second liquid constituent flow, controlling the flow of said tapped first and second liquid constituents dependent on the pressure level created by the combustion created in said rocket engine, igniting the tapped first and second liquid constituents so as to continuously create a predetermined amount of energy, continuously permitting said first and second liquid constituents to flow to said rocket engine dependent on the energy created by igniting said tapped first and second liquid constituents.

References Cited in the file of this patent

UNITED STATES PATENTS

| | | |
|---|---|---|
| 2,666,449 | Teague | Jan. 19, 1954 |
| 2,763,126 | Halford et al. | Sept. 18, 1956 |
| 2,785,532 | Kretschmer | Mar. 19, 1957 |
| 2,966,163 | Nylin | Dec. 27, 1960 |
| 2,979,891 | Widell | Apr. 18, 1961 |
| 2,984,968 | Hunter et al. | May 23, 1961 |